US009115584B2

United States Patent
Roberts et al.

(10) Patent No.: US 9,115,584 B2
(45) Date of Patent: Aug. 25, 2015

(54) RESISTIVE BAND FOR TURBOMACHINE BLADE

(75) Inventors: Herbert Chidsey Roberts, Simpsonville, SC (US); Glenn Curtis Taxacher, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 594 days.

(21) Appl. No.: 13/454,979

(22) Filed: Apr. 24, 2012

(65) Prior Publication Data

US 2013/0276459 A1 Oct. 24, 2013

(51) Int. Cl.
*F01D 5/14* (2006.01)
*F01D 5/00* (2006.01)
*F01D 5/28* (2006.01)

(52) U.S. Cl.
CPC ............... *F01D 5/005* (2013.01); *F01D 5/282* (2013.01); *F01D 5/284* (2013.01); *Y02T 50/672* (2013.01)

(58) Field of Classification Search
CPC ......... F01D 5/005; F01D 5/282; F01D 5/284; Y02T 50/672
USPC ........... 415/220, 229 R, 230; 416/229 R, 230
See application file for complete search history.

(56) References Cited

U.S. PATENT DOCUMENTS

| 3,752,600 | A | * | 8/1973 | Walsh et al. | 416/219 R |
|---|---|---|---|---|---|
| 4,071,184 | A | * | 1/1978 | Carlson et al. | 228/159 |
| 5,098,240 | A | | 3/1992 | Gapp et al. | |
| 5,292,231 | A | * | 3/1994 | Lauzeille | 416/229 A |
| 5,490,602 | A | * | 2/1996 | Wilson et al. | 216/56 |
| 5,515,798 | A | | 5/1996 | Cahuzac | |
| 5,759,321 | A | | 6/1998 | Cahuzac | |
| 6,431,837 | B1 | * | 8/2002 | Velicki | 416/223 R |
| 6,857,856 | B2 | * | 2/2005 | Potter et al. | 416/229 A |
| 7,255,549 | B2 | * | 8/2007 | Hadley | 425/129.1 |
| 2005/0260078 | A1 | * | 11/2005 | Potter et al. | 416/219 R |
| 2008/0044659 | A1 | | 2/2008 | Pilpel | |
| 2011/0143082 | A1 | * | 6/2011 | Fritz et al. | 428/77 |
| 2011/0165403 | A1 | | 7/2011 | Lefebure | |
| 2011/0217160 | A1 | * | 9/2011 | McMillan | 415/200 |
| 2011/0223027 | A1 | | 9/2011 | Klinetob et al. | |

FOREIGN PATENT DOCUMENTS

GB 2026623 A * 2/1980

* cited by examiner

*Primary Examiner* — Liam McDowell
(74) *Attorney, Agent, or Firm* — Fletcher Yoder, P.C.

(57) ABSTRACT

A turbomachine system includes a rotor that defines a longitudinal axis of the turbomachine system. A first blade is coupled to the rotor, and the first blade has first and second laminated plies. A first band is coupled to the first blade and is configured to resist separation of the first and second laminated plies.

18 Claims, 3 Drawing Sheets

RESISTIVE BAND FOR TURBOMACHINE BLADE

STATEMENT REGARDING FEDERALLY SPONSORED RESEARCH

This invention was made with government support under DE-FC26-05NT42643 awarded by the Department of Energy (DOE). The government has certain rights in the invention.

BACKGROUND OF THE INVENTION

The subject matter disclosed herein relates to turbomachines, and more specifically, to systems to improve the durability of blades of the turbomachine.

Turbomachines, such as compressors and turbines, are used to transfer energy between a rotor and a fluid. For example, turbine engines provide thrust to power airplanes, ships, and generators. Turbomachines generally include blades that rotate about a shaft or rotor to transfer energy between the rotor and the fluid. In addition, the blades may be supported by the rotor. For example, the turbomachine blades may be attached to or mounted in the rotor. During operation of the turbomachine, the blades may experience high stresses due to rapid rotation of the blade and/or high operating temperatures. Unfortunately, the high stresses may cause the blade to degrade, and, in certain situations, mechanically fail.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbomachine. The turbomachine includes a rotor defining a longitudinal axis of the turbomachine system. A first blade is coupled to the rotor, and the first blade has first and second laminated plies. A first resistive band is coupled to the first blade and is configured to resist separation of the first and second laminated plies.

In a second embodiment, an apparatus includes a turbomachine blade configured to mount in a fluid path of a turbomachine. The apparatus also includes a resistive band coupled to the turbomachine blade, which is configured to resist separation of the turbomachine blade.

In a third embodiment, a gas turbine engine includes a compressor, a combustor, and a turbine. The compressor has a plurality of compressor blades and is configured to compress air. The combustor is configured to receive the compressed air from the compressor and to combust a mixture of compressed air and fuel into combustion products. The turbine has a plurality of turbine blades and is configured to receive the combustion products from the combustor. A resistive band is coupled to a first blade of the plurality of compressor blades or the plurality of turbine blades. The first blade has first and second laminated plies. The resistive band is configured to resist separation of the first and second laminated plies.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE INVENTION

Figure 1:
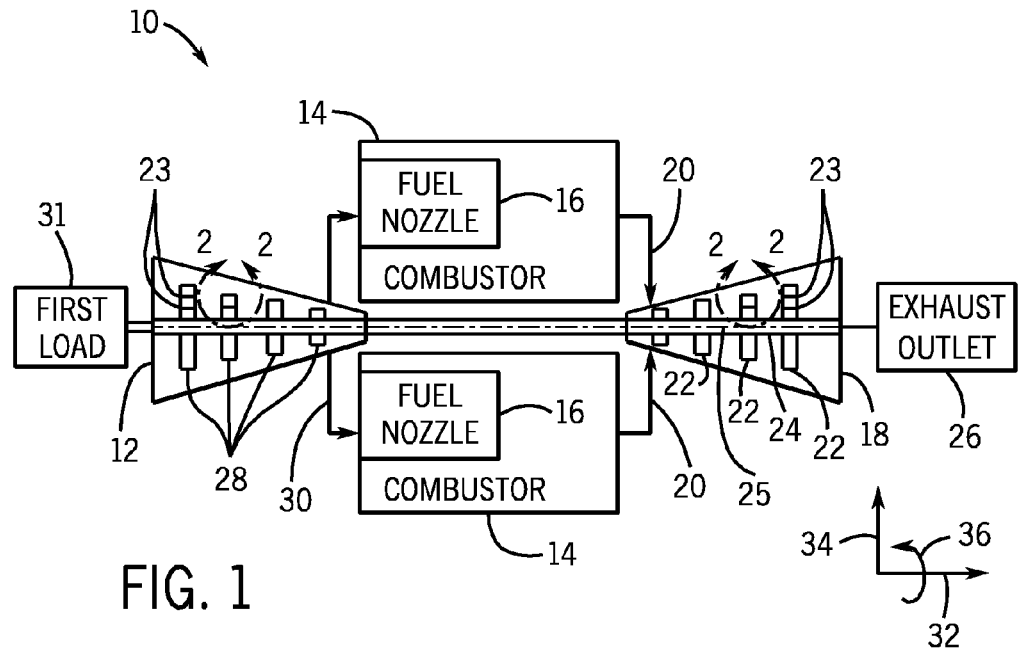
FIG. 1 is a schematic block diagram of an embodiment of a turbine engine system having turbine blades with resistive bands, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As noted above, the blades of a turbomachine may experience relatively high levels of mechanical stress, such as stress caused by thermal expansion and contraction, pressure, friction, rotational forces, and/or the like. Again, these stresses may cause the blade to degrade. In configurations in which the blades are formed from a composite material, the blades may crack or separate at grain boundaries formed between adjacent materials (e.g., between adjacent plies or between a matrix and a filler). The cracks or separations may weaken the blade, and may be a gateway for dirt or moisture, which can accelerate degradation of the blade. For example, in some configurations, the each turbomachine blade may be a composite assembly of two or more laminated plies, with each ply being disposed substantially parallel to the others. Unfortunately, when the laminated plies are locally compressed such as during rotation of the blade, the plies may separate in a transverse direction relative to the parallelism of the plies.

Thus, it is now recognized that it may be desirable to reduce the onset or occurrence of crack formation or separation of the plies to enhance the durability of turbomachine blades. Accordingly, as discussed in detail below, the present disclosure provides a resistive band that is coupled to the blade and is configured to resist the transverse separation mentioned above. Additionally, the resistive band may reduce interlaminar tension (ILT), reduce the likelihood or magnitude of cracks in the blade, and provide local compression loading to improve the durability of the turbomachine blades. As discussed herein, the term resistive band is intended to include shapes that loop around the entire blade, around a portion of the blade, extend on one or more surfaces of the blade, and/or extend through the blade.

Turning now to the drawings, FIG. 1 is a schematic block diagram of an embodiment of a gas turbine system 10 having a turbomachine that is equipped with resistive bands. Again, in certain embodiments, these bands may improve the durability of blades within the turbomachine. As shown, the gas turbine system 10 includes a compressor 12, combustors 14 having fuel nozzles 16, and a turbine 18. The fuel nozzles 16 route a liquid fuel and/or gas fuel, such as natural gas or syngas, into the combustors 14. The combustors 14 ignite and combust a fuel-air mixture, and then pass hot pressurized combustion gases 20 (e.g., exhaust gases) into the turbine 18. Turbine blades 22 are coupled to a rotor 24 (e.g., rotating blades), and the rotor 24 is coupled to several other components throughout the gas turbine system 10, as discussed below. Some of the turbine blades 22 may be mounted to stator components of the turbine 18 (e.g., stationary blades). In accordance with present embodiments, the turbine blades 22 may include one or more resistive bands 23 to resist separation of the turbine blades 22, as discussed below. As the combustion gases 20 pass over the turbine blades 22 in the turbine 18, the turbine blades 22 are driven into rotation. The rotating blades 22 transfer this rotational energy to the rotor 24, which causes the rotor 24 to rotate along a rotational axis 25. Eventually, the combustion gases 20 exit the turbine 18 via an exhaust outlet 26 (e.g., exhaust duct, exhaust stack, silencer, etc.).

In the illustrated embodiment, the compressor 12 includes compressor blades 28. The compressor blades 28 within the compressor 12 are also coupled to the rotor 24 (e.g., rotating blades), and rotate as the rotor 24 is driven into rotation by the turbine 18, as described above. Some of the compressor blades 28 may be mounted to stator components of the compressor 12 (e.g., stationary blades). The compressor blades 28 may also include one or more resistive bands 23 to resist separation or crack formation in the compressor blades 28, as discussed below. As the compressor blades 28 rotate within the compressor 12, the compressor blades 28 compress air from an air intake into pressurized air 30. As illustrated, the pressurized air 30 is routed to the combustors 14, the fuel nozzles 16, and other portions of the gas turbine system 10. The fuel nozzles 16 then mix the pressurized air 30 and fuel to produce a suitable fuel-air mixture, which combusts in the combustors 14 to generate the combustion gases 20 to drive the rotor 24 and the turbine 18. Additionally, the rotor 24 may be coupled to a load 31, which may be powered via rotation of the rotor 24. The load 31 may be any suitable device that may generate power via the rotational output of the gas turbine system 10, such as a power generation plant or an external mechanical load. For example, the load 31 may include an electrical generator, a propeller of an airplane, and so forth. In the following discussion, reference may be made to various directions or axes, such as an axial direction 32 along the axis 25, a radial direction 34 away from the axis 25, and a circumferential direction 36 around the axis 25 of the turbine 18.

Figure 2:
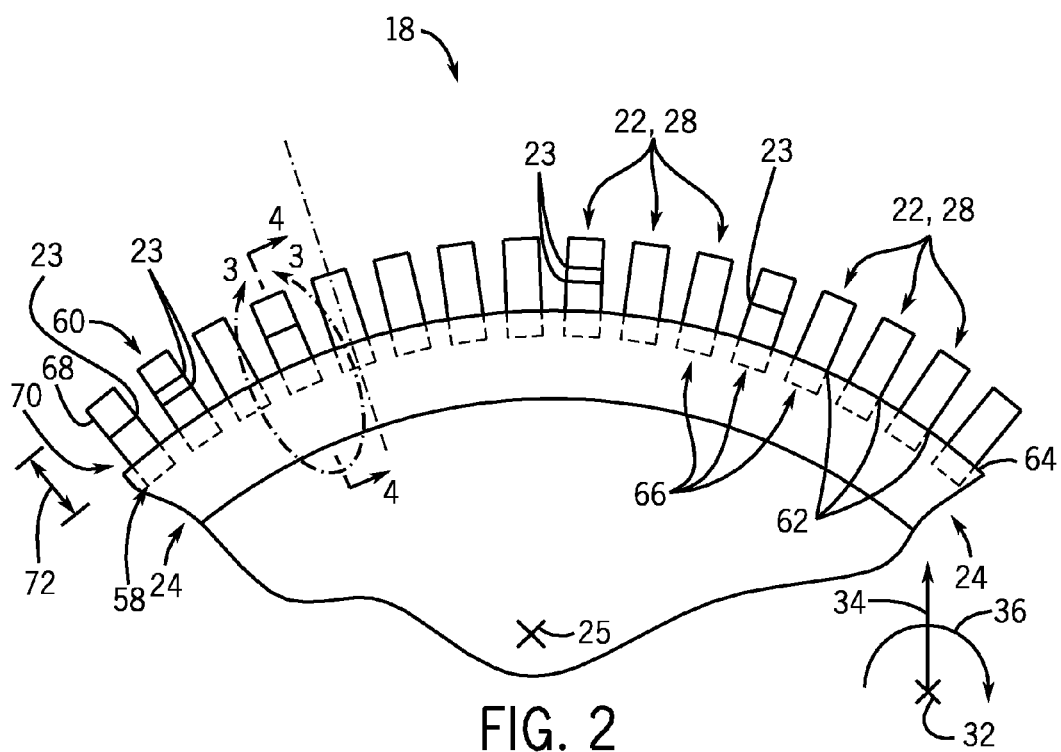
FIG. 2 is a partial cross-sectional axial view of a turbomachine taken along line 2-2 of FIG. 1, illustrating an embodiment of the rotor of FIG. 1 having circumferentially mounted turbomachine blades with resistive bands, in accordance with an aspect of the present disclosure.

FIG. 2 is a partial cross-sectional axial view taken along line 2-2 of FIG. 1, illustrating the rotor 24 with circumferentially mounted turbomachine blades (e.g., compressor blades 28 or turbine blades 22). For clarity, the turbine blades 22 will be described below. However, the ensuing discussion is also applicable to the compressor blades 28 and the compressor 12. Indeed, the embodiments presented herein may be applicable to any turbomachine blade or airfoil that may be susceptible to crack propagation or ply separation as described herein. As noted above, the turbine blades 22 may include one or more resistive bands 23 to resist separation or crack formation in of the turbine blades 22. In the illustrated embodiment, certain turbine blades 22 have one resistive band 23 while others have two resistive bands 23. In general, each of the turbine blades 22 may include 1, 2, 3, 4, or more resistive bands 23. Additionally, it is also presently contemplated that a turbomachine may incorporate different turbine blades having different numbers of resistant bands. Moreover, some of the turbine blades 22 may not include the resistive bands 23.

FIG. 2 illustrates a set of turbine blades 22 disposed at a common position (e.g., turbine stage) along an axial direction 32 of the rotor 24. However, the turbine blades 22 with resistive bands 23 may be disposed at different turbine stages, as shown in FIG. 1. For example, any one or a combination of the stages of the turbine 18 may include the turbine blades 22 having the resistive bands 23. As may be appreciated, the temperature and pressure of the turbine 18 may vary along the axial direction 32 of the turbine 18, and the number of resistive bands 23 on each turbine blade 22 may correspond to the operating parameters of the turbine 18.

As shown, the turbine blades 22 extend in a radial direction 34 away from the longitudinal axis 25 of the rotor 24 from a proximal end 58 to a distal end 60. As discussed herein, the proximal end 58 is disposed toward the longitudinal axis 25, and the distal end 60 is disposed away from the longitudinal axis 25. In the illustrated embodiment, the turbine blades 22 are mounted to the rotor 24 through an opening 62 in an outer circumference 64 of the rotor 24. The opening 62 may have a square shape, a circular shape, a dovetail shape, or another suitable shape to accommodate mounting the turbine blades 22. More specifically, the proximal end 58 of the turbine blades and the opening 62 of the rotor 24 may abut at an interface region 66. The interface region 66 may have a similar shape as the opening 62 (e.g., square, circular, dovetail, or another suitable shape). Thus, the turbine blades 22 may be mounted in or otherwise attached to the rotor 24. Accordingly, a portion of the turbine blades 22 is disposed within the interface region 66 of the rotor 24. In addition, another portion (e.g., exposed portion 68) of the turbine blades 22 is disposed radially 34 outward from the interface region 66. During operation of the turbine 18, the flow of combustion gases 20 across the exposed portions 68 may cause the rotor 24 to rotate and drive the turbine 18. As may be appreciated, the combustion gases 20 may subject the turbine blades 22 to high mechanical or thermal stresses, and the resistive bands 23 may mitigate or reduce the impact of those stresses by providing a compacting or similar force to resist separation or cracking of the blades 22.

The exposed portion 68 of each turbine blade 22 extends from an exposed proximal end 70 to the distal end 60 of the turbine blade 22. The exposed proximal end is outward along the radial direction 34 from the interface region 66 of the rotor 24. In addition, the distance between the exposed proximal end 70 and the distal end 60 defines a span 72 of the exposed portion 68. The span 72 may be defined such that 0 percent of the span 72 corresponds to the exposed proximal end 70, and 100 percent of the span 72 corresponds to the distal end 60. In certain embodiments, the resistive bands 23 may be disposed at radial positions corresponding to various percentages (e.g., approximately 10 to 60, 15 to 55, or 20 to 50 percent) of the span 72 to improve the durability and lifespan of the turbine blade 22, as discussed further below.

Figure 3:
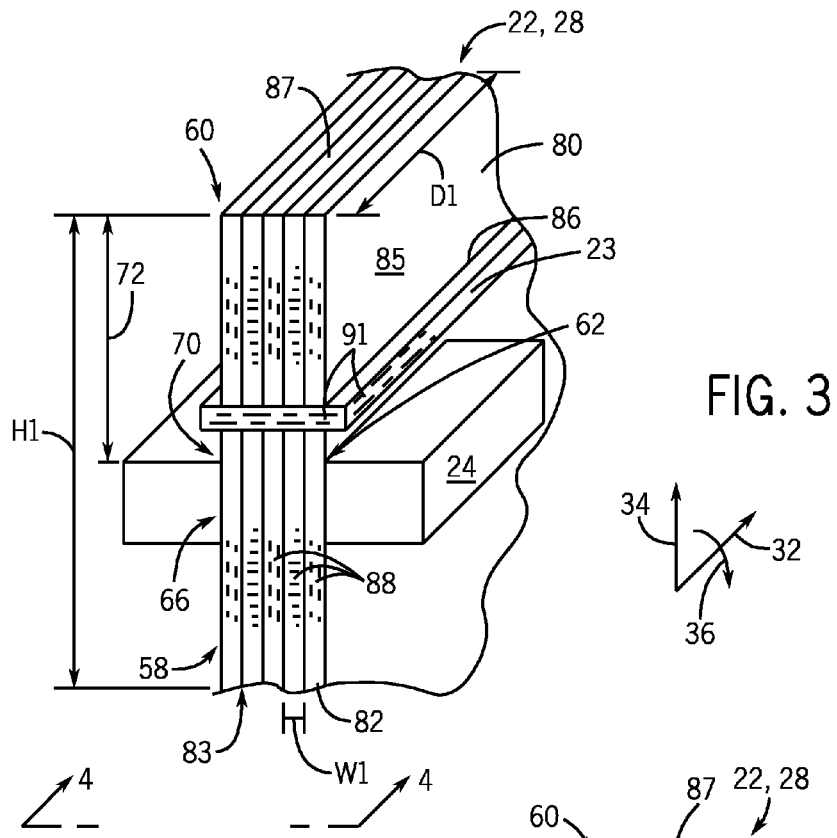
FIG. 3 is a schematic perspective view of the turbomachine taken within line 3-3 of FIG. 2, illustrating an embodiment of a turbomachine blade having a resistive band, in accordance with an aspect of the present disclosure.

The manner in which the resistive bands 23 may improve the durability of the turbine blades 22 is depicted schematically in FIG. 3, which is a perspective view taken along line 3-3 of FIG. 2 of an embodiment of a turbomachine blade (e.g., rotating or stationary compressor blade 28, or rotating or stationary turbine blade 22). Again, for clarity, the turbine blades 22 will be described below, but the ensuing discussion is also applicable to the compressor blades 28 or any turbomachine blade/airfoil. Generally, the turbine blade 22 may be a composite assembly 80 of two or more laminated plies 82 (e.g., 2, 3, 4, 5, 6, or more), with each of the laminated plies 82 extending in the radial direction 34 from the proximal end 58 to the distal end 60 of the turbine blade 22. As illustrated, the turbine blade 22 includes five laminated plies 82 that are disposed adjacent to one another (e.g., laminated against one another) generally along the circumferential direction 36. Accordingly, boundaries 83 are formed between the laminated plies 82, with the boundaries 83 being oriented generally parallel with respect to the plies 82 and crosswise with respect to the circumferential direction 36. In other embodiments, however, the laminated plies 82 may be disposed adjacent to one another in a different orientation, such as generally along the axial direction 32. To resist separation of the laminated plies 82 at their boundaries 83, the resistive band 23 may be oriented crosswise to the radial direction 34 of the laminated plies 82. Indeed, the resistive band 23 may improve the durability of the turbine blade 22 by resisting transverse separation of the laminated plies 82 in the circumferential direction 36.

The laminated plies 82 each have a depth D1 in the axial direction 32, a height H1 in the radial direction 34, and a width W1 in the circumferential direction 36. These dimensions of the laminated plies 82, the material composition of the laminated plies 82, or other characteristics of the laminated plies 82 may be uniform or may vary within or among the turbine blades 22. As illustrated, each of the laminated plies 82 have a similar depth D1, height H1, width W1, and material composition relative to the other laminated plies 82. Accordingly, the load-bearing capabilities of the laminated plies 82 may be similar. However, the stress or compression loading of the turbine blade 22 experienced during operation of the turbomachine may not be uniform in the axial 32, radial 34, or circumferential 36 directions. Accordingly, the characteristics of the laminated plies 82 may be designed to vary within the turbine blade 22. For example, the laminated plies 82 may have a larger width at a circumferential end 85 and a smaller width at a central ply 87. In addition, the width W1 of the laminated plies 82 may gradually change from the circumferential end 85 to the central ply 87.

In addition to or as an alternative to varying the dimensions of the laminated plies 82, the material composition of the laminated plies 82 may be designed for the turbine blade 22 to withstand relatively high mechanical or thermal stresses. Generally, the laminated plies 82 may have a material composition that includes a ceramic, a metal, a polymer, a fiberglass, an epoxy, another suitable material, or any combination thereof. For example, in one embodiment, the laminated plies 82 may be constructed from a ceramic matrix composite (CMC). However, the material composition may vary among the laminated plies 82 of the turbine blade 22. For example, the material composition may alternatingly vary from ceramic to metal between adjacent laminated plies 82. Additionally or alternatively, characteristics of the material composition may vary among the laminated plies 82. For example, the laminated plies 82 may be constructed from fibers 88 (e.g., silicon carbide fibers), and the fibers 88 of the central ply 87 may be directed radially 34, while the fibers 88 of the remaining laminated plies 82 may be directed transverse (e.g., axially 32 or circumferentially 36) to the fibers 88 of the central ply 87. Further, the direction of the fibers 88 may alternatingly vary from radial 34 or circumferential 36 between adjacent laminated plies 82. In certain embodiments, the fibers 88 may be angled relative to the rotor 24. Indeed, any characteristic of the laminated plies 82 may be varied and is considered to be within the scope of the present disclosure.

As illustrated, the turbine blade 22 has the resistive band 23, which may increase the durability and lifespan of the turbine blade 22 by resisting separation of the laminated plies 82 (e.g., at the boundaries 83). In some embodiments, it may be desirable for the material compositions of the resistive band 23 and the turbine blade 22 to be similar such that the resistive band 23 and the laminated plies 82 have similar structural properties such as resistivity to deformation and mechanical strength. Accordingly, the resistive band 23 may be constructed from a ceramic, a metal, a polymer, a fiberglass, an epoxy, another suitable material, or any combination thereof. For example, in one embodiment, the resistive band 23 and the turbine blade 22 may both be constructed from silicon carbide. As noted previously, laminated plies 82 may be constructed from fibers 88 (e.g., composite fibers), and the fibers 88 may be oriented such that the fibers 88 of adjacent laminated plies 82 are transverse, substantially parallel, or any combination thereof. The resistive band 23 may also be constructed from fibers 91 (e.g., composite fibers). The fibers 91 may be oriented in substantially one direction (e.g., axial 32, radial 34, or circumferential 36 direction), or in several directions. In some embodiments, the fibers 91 of the resistive band 23 may be oriented in a particular direction with respect to the fibers 88 of the laminated plies 82 to provide enhanced resistance to separation. For example, in one embodiment, the fibers 91 of the resistive band 23 may be oriented such that they are transverse to the fibers 88 of each of the laminated plies 82.

Additionally or alternatively, the selection of materials of the laminated plies 82 and the resistive band 32 may be at least partially based on various thermophysical properties of the materials, such as a coefficient of thermal expansion, or a. For example, it may be desirable for the a of the resistive band 23 to be less than or approximately equal to the a of the turbine blade 22. As may be appreciated, the resistive band 23 and the turbine blade 22 may expand as their respective temperatures increase from room temperature to the turbine normal operating temperature. The resistive band 23 may expand less (e.g., approximately 0 to 20, 2 to 18, or 5 to 15 percent less) than the turbine blade 22, which may further resist transverse separation of the laminated plies 82 and improve the durability of the turbine blade 22. In other embodiments, the selection of materials may be partially based on other characteristics, such as thermal conductivity, density, Young's modulus, or another suitable material property. Indeed, the selection of materials may be based on any suitable property.

In the embodiment illustrated in FIG. 3, the resistive band 23 extends in the circumferential 36 and axial directions 32 about an entire perimeter 86 of the turbine blade 22. Generally, the entire perimeter 86 may have a shape defined by a cross-section through a transverse plane of the turbine blade 22. In certain embodiments, the shape may be a rectangular shape, a circular shape, a dovetail shape, or another suitable shape. In one embodiment, the entire perimeter 86 may have a shape generally corresponds to the opening 62 in the rotor 24. Accordingly, the resistive band 23 may resist transverse (e.g., circumferential 36 and/or axial 32) separation due to mechanical and/or thermal stresses of the laminated plies 82. The resistive band 23 may improve the durability and lifespan of the turbine blade 22 by reducing interlaminar tension, which concomitantly reduces the likelihood or magnitude of cracks in the turbine blade 22 and provides local compression loading to the turbine blade 22. In certain embodiments, turbine blade 22 may include more than one resistive band 23 to further improve the durability of the turbine blade 22. Indeed, in such embodiments, the resistive band may be disposed in various positions along the radial direction 34, as described in further detail below with respect to FIG. 4.

Figure 4:
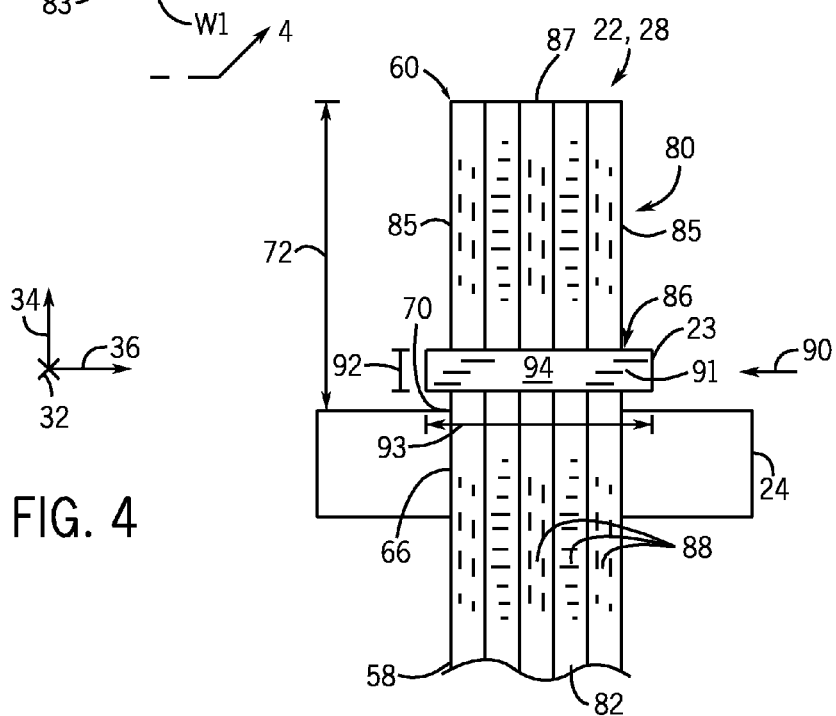
FIG. 4 is a schematic front view of the turbomachine blade of FIG. 3 taken along line 4-4, illustrating an embodiment in which the turbomachine blade has a resistive band configured to resist the separation of plies of the turbomachine blade, in accordance with aspects of the present disclosure.

FIG. 4 is a front view of the turbomachine blade of FIG. 3 taken along line 4-4, illustrating an embodiment of the turbomachine blade (e.g., rotating or stationary compressor blade 28, or rotating or stationary turbine blade 22) having the resistive band 23 configured to resist separation of the laminate plies 82 of the composite assembly 80. Again, while the illustrated embodiment is discussed in the context of the turbine blades 22, the ensuing discussion is also applicable to any turbomachine blade, such as the compressor blades 28 of FIG. 1. As illustrated, the resistive band 23 is disposed at a radial position 90 between the interface region 66 and the distal end 60 of the turbine blade 22. The radial position 90 may be represented by a percentage of the span 72. For example, in some embodiments, the percentage may be approximately 1 to 60, 5 to 50, or 20 to 40 percent. As may be appreciated, the mechanical and thermal stresses on the blade may vary depending on the axial 32 position of the rotor 24 or the turbine blades 22. Accordingly, the radial position 90 of the resistive band 23 may vary among each of the turbine blades 22. For example, the radial position 90 of the resistive band 23 may be 10 percent of the span 72 for one turbine blade 22 and 20 percent of the span 72 for another turbine blade 22. Alternatively or additionally, the resistive band 23 may be disposed outside the span 72 of the turbine blade 22, such as within the interface region 66, as discussed further with respect to FIG. 7. In such an embodiment, the resistive band 23 may be exposed to a reduced amount of hot combustion gases compared to a configuration in which the resistive band 23 is disposed within the span 72, while simultaneously improving the durability and lifespan of the turbine blade 22 by preventing separation of the laminated plies 82 and/or by providing a compressive/stabilizing force on the turbine blade 22.

The resistive band 23 may be coupled to the turbine blade 22 at the radial position 90 using any suitable method, depending, for example, on the materials used for the turbine blade 22 and the resistive band 23, the expected forces that the turbine blade 22 will experience when in use, the expected operating temperature of the turbine blade 22, and so forth. For example, in some embodiments, the resistive band 23 may be adhesively coupled, mechanically coupled, or a combination thereof, to the turbine blade 22. Indeed, such methods of attachment may enable the resistive band 23 to be attached to a turbomachine blade during original manufacture of the turbomachine blade, or during a remanufacture process in which the resistive band 23 is retrofit onto an existing turbomachine blade.

In embodiments where the resistive band 23 is adhesively coupled to the turbine blade 22, the resistive band 23 may be adhered to the laminated plies 82 using a composite glue. In certain of these embodiments, the composite glue may have a material composition that is substantially similar to the material compositions of the resistive band 23 and the turbine blade 22. For example, in embodiments where the turbine blade 22 and/or the resistive band are constructed using a CMC such as silicon carbide, the composite glue may include silicon carbide, elemental silicon, or a combination thereof. Further, the composite glue may have certain properties that provide enhanced resistivity to separation and crack formation of the turbine blade 22 by the resistive band 23. For example, the composite glue may have a coefficient of thermal expansion ($\alpha$) that is less than or approximately equal to the $\alpha$ of the laminated plies 82 or the resistive band 23. Accordingly, the composite glue may expand in a manner such that the resistive band 23 remains coupled to the turbine blade 22 when the turbine 18 reaches the turbine normal operating temperature.

Additionally or alternatively, as noted above, the resistive band 23 may be mechanically coupled to the turbine blade 22. For example, the resistive band 23 may be bolted, welded, brazed, or otherwise mechanically affixed to the laminated plies 82 of the turbine blade 22. For example, in certain embodiments, the blade 22 may include solid or hollow rivets or threaded assemblies (e.g., tie-rods, bolts, or other threaded fasteners). Thus, the resistive band 23 may be retrofit into existing turbomachines (e.g., compressor 28 or turbine 18) by adhesively or mechanically coupling to existing blades (e.g., compressor blades 28 or turbine blades 18). In some embodiments, the resistive band 23 may be integrally formed with the turbine blade 22 as a one-piece structure. Indeed, in such embodiments, the resistive band 23 and the turbine blade 22 may be formed from the same material (e.g., a CMC material such as silicon carbide) or from different materials (e.g., first and second CMC materials, or a CMC material and a metal). Thus, one or more of the turbine blades 22 having an integrally-formed resistive band 23 may also be retrofit into existing turbomachines.

As illustrated, the resistive band 23 extends about the entire perimeter 86 of the turbine blade 22. The resistive band 23 may provide compression loading for each of the laminated plies 82, thereby resisting separation of all of the laminated plies 82. The resistive band has a depth in the axial direction 32, a height in the radial direction 34 (e.g., thickness 92), and a width 93 in the circumferential direction 36. In certain embodiments, the thickness 92 of the resistive band 23 may vary. For example, the thickness 92 may be approximately 1 to 30, 5 to 20, or 10 to 15 percent of the span 72 of the turbine blade 22. Additionally or alternatively, the thickness 92 may be approximately 1 to 150, 30 to 100, or 50 to 70 percent of the circumferential 36 width of the composite assembly 80. In certain embodiments, a ratio of the thickness 92 to the width 93 of the resistive band may be approximately 0.05 to 1, 0.1 to 0.9, or 0.2 to 0.8. Further, in certain embodiments, the thickness 92 may vary between the circumferential ends 85 of the turbine blade 22. For example, the thickness 92 may be smallest at the central ply 87 and largest at the circumferential ends 85. Accordingly, a cross-sectional shape 94 of the resistive band 23 may vary in the axial 32, radial 34, or circumferential 36 directions. While the cross-sectional shape 94 may have any suitable geometry, as illustrated, the circumferential 36 cross-sectional shape 94 is substantially rectangular. However, in certain embodiments, the cross-sectional shape 94 may be triangular or otherwise polygonal, elliptical, or curved. As may be appreciated, the compression loading on the turbine blade 22 may be non-uniform in the axial 32, radial 34, or circumferential 36 directions, and the shape 94 of the resistive band 23 may be designed at least partially based on the stress distribution of the turbine blade 22. Accordingly, the cross-sectional shape 94 of the resistive band 23 may vary among the turbine blades 22. As discussed previously, the temperature and pressure of the turbine 18 may vary along the axial direction 32, and the cross-sectional shape 94 of the resistive band 23 may be at least partially based on the temperature and/or pressure profile of the turbine 18. In certain embodiments, as described further below with respect to FIGS. 5-7, the turbine blades 22 may include additional resistive bands to further resist separation of the laminated plies 82.

Figure 5:
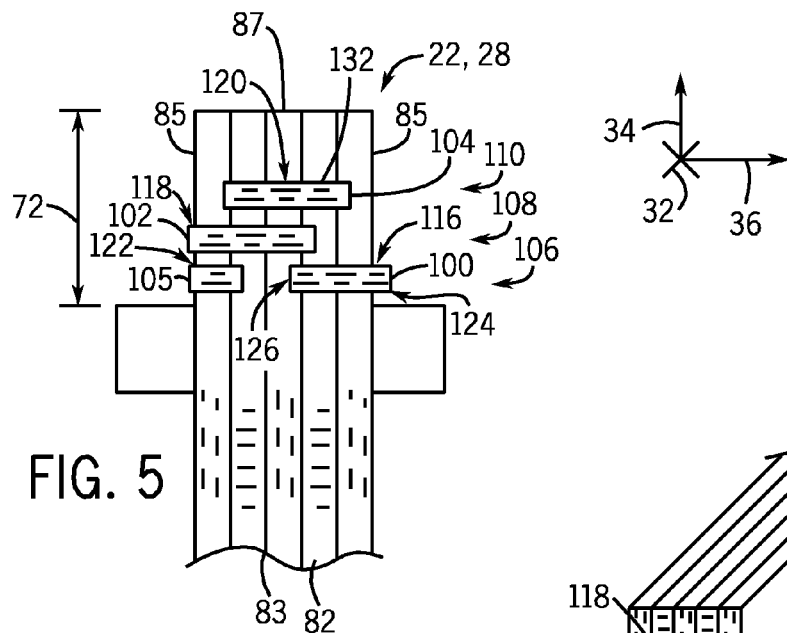
FIG. 5 is a schematic front view of an embodiment of a turbomachine blade having multiple resistive bands, in accordance with an aspect of the present disclosure.

FIG. 5 is a front view of an embodiment of a turbomachine blade (e.g., compressor blade 28 or turbine blade 22) having multiple resistive bands 23 configured to resist separation of the laminated plies 82 and improve the durability of the turbomachine blade. For clarity, the turbine blades 22 will be described. However, the ensuing discussion is also applicable to the compressor blades 28. In general, the resistive bands 23 may be disposed at different radial positions 90 of the turbine blade 22 or at similar radial positions 90 of the turbine blade 22. Further, the resistive bands 23 may be disposed on the turbine blades 22 with the same or different axial 32 positions along the turbine 18 (e.g., same or different turbine stages).

As illustrated, the turbine blade 22 includes multiple resistive bands 23 (e.g., resistive bands 100, 102, 104, and 105). As previously noted, the turbine blade 22 may include 1, 2, 3, 4, or more resistive bands 23. Further, the resistive bands 100, 102, 104, 105 may vary in certain characteristics, such as the depth in the axial direction 32, the height in the radial direction 34 (e.g., thickness 92), the width 93 in the circumferential 36, or material composition, as discussed above. In certain embodiments, it may be desirable to use the multiple resistive bands 23 because the stress profile of the turbine blade 22 may not be uniform in the radial direction 34. Indeed, the variation of the characteristics of the resistive bands 100, 102, 104, 105 may be based at least partially on the radial positions 90 (e.g., radial positions 106, 108, 110) of the resistive bands 100, 102, 104, 105. As shown, the resistive bands 100, 105 share the common radial position 106. The radial position 106 is closest to the interface region 66, the radial position 110 is the furthest, and the radial position 108 is disposed therebetween. For example, the radial position 106 is approximately 10 percent of the span 72, the radial position 108 is approximately 30 percent of the span 72, and the radial position 110 is approximately 60 percent of the span 72. In certain embodiments, the radial positions 106, 108, 110 may vary.

Additionally, each of the resistive bands 100, 102, 104, 105 extends about a portion of the entire perimeter 86 of the turbine blade 22 (e.g., partial perimeters 116, 118, 120, 122). Thus, the resistive bands 100, 102, 104, 105 may extend about a subset (e.g., approximately 10 to 90, 20 to 80, or 40 to 60 percent) of the laminated plies 82, and may resist separation of that subset of laminated plies 82. For example, the partial perimeter 116 extends from the circumferential end 85 to the central ply 87. The partial perimeter 120 is contained within the circumferential ends 85 of the turbine blade 22. By way of non-limiting example, the partial perimeters 116, 118, 120, 122 may be approximately 10 to 90, 20 to 80, or 30 to 60 percent of the entire perimeter 86. In other words, the partial perimeters 116, 118, 120, 122 may be some factor or percentage of the entire perimeter 86. For example, each of the partial perimeters 116, 122 is less than the entire perimeter 86. However, the combination of the partial perimeters 116, 118 is greater than the entire perimeter 86. Accordingly, the amount of compression loading by the resistive bands 100, 102, 104, 105 may be varied.

Figure 6:
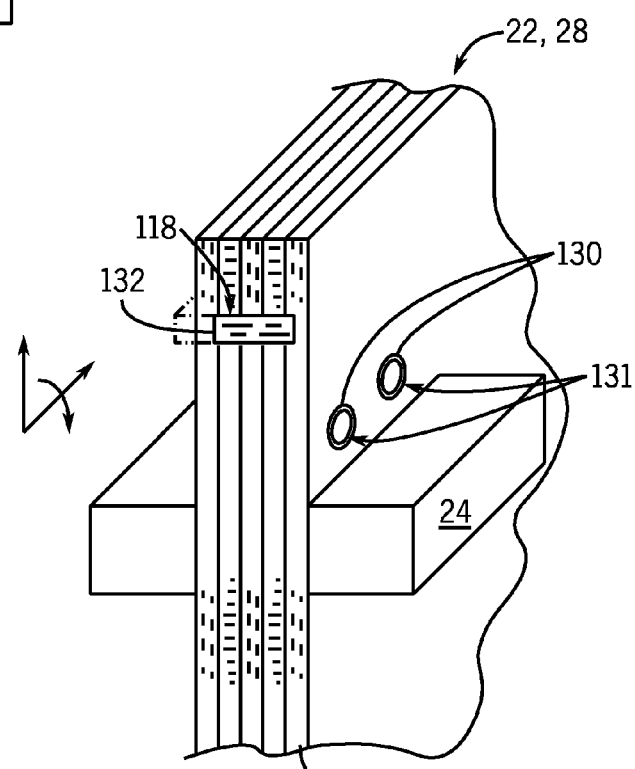
FIG. 6 is a schematic perspective view of the turbomachine blade of FIG. 3 taken along line 3-3, illustrating an embodiment in which the turbomachine blade has through-holes and one or more resistive bands disposed in the through holes, in accordance with an aspect of the present disclosure.

The resistive bands 100, 102, 104, 105 may extend in the axial direction 32 through or around the turbine blade 22. For example, a circumferential end 124 of the resistive band 100 may extend in the axial direction 32 around the turbine blade 22, while an opposite circumferential end 126 of the resistive band 100 may extend in the axial direction 32 through the turbine blade 22. For example, in some embodiments, any one or a combination of the resistive bands 100, 102, 104, 105 may extend around an exterior of turbine blade 22 (e.g., around one of the circumferential ends 85) and between any one of the boundaries 83 between the laminated plies 83, thereby encompassing the cross-sectional perimeter in the circumferential and axial directions 32, 36 of at least two adjacent plies 83. Additionally or alternatively, the turbine blade 22 may include one or more through-holes 130 to accommodate the resistive bands 100, 102, 104, 105, as illustrated by FIG. 6. Indeed, such a configuration may be desirable in certain embodiments to avoid having a band disposed between the boundaries 83, or in addition to such a configuration. Thus, the resistive band 132 may extend circumferentially 36 through the through-holes 130. The through-holes 130 may have a shape 131 defined by a cross-section through a plane defined by the orientation of the plies 83 that may generally accommodate the resistive bands 100, 102, 104, 105. For example, the shape 131 may be circular, elliptical, rectangular, or another suitable shape.

As shown in FIG. 6, the turbine blade 22 may include a resistive band 132 that does not form a full loop around the turbine blade 22. Rather, the resistive band 132 may only extend in one direction (e.g., circumferentially) on one surface of the turbine blade 22. Accordingly, the resistive band may resist separation of a subset of the laminated plies 82. As compared to the resistive band 118, the resistive band 132 may have a smaller mass and/or volume, which may decrease the overall mass and/or volume of the turbine blade 22, thereby increasing the efficiency of the turbine. In certain embodiments, the turbine blade 22 may include combinations of the resistive bands 132 that do not form a full loop around the turbine blade 22 and the resistive bands 23 that do form a full loop around the turbine blade 22.

Figure 7:
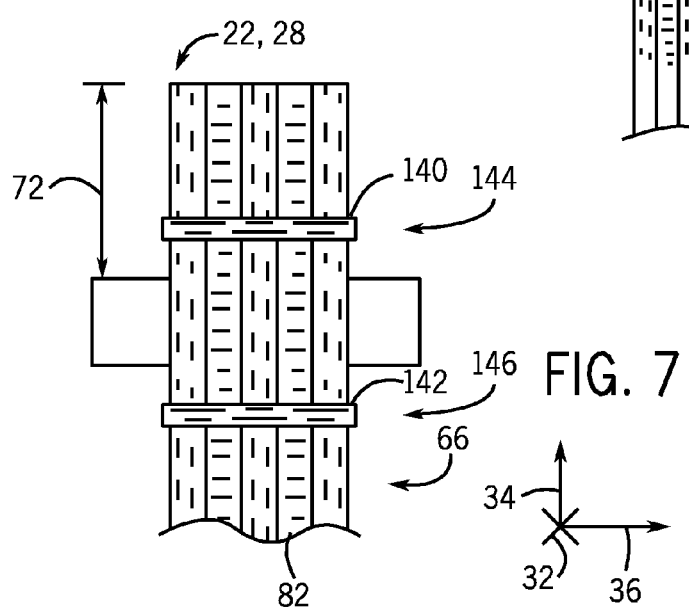
FIG. 7 is a schematic front view of an embodiment of a turbomachine blade having multiple resistive bands, in accordance with an aspect of the present disclosure.

FIG. 7 is a front view of a turbomachine blade (e.g., rotating or stationary compressor blade 28, or rotating or stationary turbine blade 22) having multiple resistive bands 23 (e.g., 140, 142) configured to resist separation of the laminated plies 82 and improve the durability of the of the turbomachine blade. For clarity, the turbine blades 22 will be described. However, the ensuing discussion is also applicable to any turbomachine blade, such as the compressor blades 28. As illustrated, the resistive band 140 is disposed at a radial position 144, and the resistive band 142 is disposed at a radial position 146. The radial position 144 is disposed outward in the radial direction 34 from the interface region 66, and is within the span 72 of the turbine blade 22. However, the resistive band 142 is disposed within the interface region 66, and is outside of the span 72. As discussed previously, the resistive band 142 may be relatively isolated (e.g., compared to the resistive band 140) from the operating conditions of the turbine 18, while simultaneously resisting separation of the laminated plies 82.

Technical effects of the disclosed embodiments include a resistive band to improve the durability of blades of a turbomachine. The resistive band may resist separation of laminated plies of the turbomachine blade. Additionally, the turbomachine blades may include multiple resistive bands, each with varying characteristics, disposed at various radial positions of the blade, to further resist separation of the laminated plies. The resistive band may reduce interlaminar tension, reduce the likelihood or magnitude of cracks in the blade, and provide local compression loading to improve the durability of the blades of the turbomachine.

This written description uses examples to disclose embodiments of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a turbomachine, comprising:
      a rotor defining a longitudinal axis of the turbomachine;
      a first blade coupled to the rotor, wherein the first blade comprises a first laminated ply, a second laminated ply, and an exposed portion extending outward from the rotor in a radial direction; and
      a first resistive band coupled to the first blade and configured to resist separation of the first laminated ply and the second laminated ply by providing compression loading to compress the first laminated ply and the second laminated ply together, wherein the first resistive band is disposed on the first blade at the exposed portion and the first resistive band is spaced apart from the rotor in the radial direction.

2. The system of claim 1, wherein the first resistive band is adhesively coupled, mechanically coupled, or a combination thereof, to the first blade.

3. The system of claim 1, wherein the first resistive band is disposed on the first blade about a perimeter of the first blade.

4. The system of claim 1, comprising a second resistive band coupled to the first blade and configured to resist separation of the first and second laminated plies, wherein the first resistive band extends around a first portion of an entire perimeter of the first blade, and the second resistive band extends around a second portion of the entire perimeter of the first blade.

5. The system of claim 4, wherein a combination of the first portion and the second portion is greater than or equal to the entire perimeter of the first blade.

6. The system of claim 4, wherein the first and second resistive bands are disposed at different radial positions on the first blade.

7. The system of claim 1, wherein the first blade comprises a proximal end disposed toward the longitudinal axis and a distal end disposed away from the longitudinal axis, and wherein the first blade and the rotor are coupled at an interface region comprising the proximal end of the first blade and an opening in an outer circumference of the rotor.

8. The system of claim 7, wherein the first blade comprises a span defined by a distance between an exposed proximal end and the distal end, the first resistive band is disposed on the first blade at a radial position, the radial position and the proximal end define a spacing, and wherein the spacing comprises less than or approximately equal to 20 percent of the span.

9. The system of claim 7, wherein the first laminated ply and the second laminated ply of the first blade are oriented along the radial direction, and the first resistive band is oriented crosswise to the radial direction.

10. The system of claim 1, comprising a second resistive band disposed on the first blade, wherein the second resistive band is configured to resist separation of the first and second laminated plies.

11. The system of claim 10, wherein the second resistive band is positioned within the interface region.

12. The system of claim 1, comprising:
   the first blade coupled to the rotor at a first axial position of the turbomachine;
   a second blade coupled to the rotor at a second axial position offset from the first axial position, wherein the second blade comprises a third laminated ply and a fourth laminated ply; and
   a second resistive band coupled to the second blade and configured to resist separation of the third laminated ply and the fourth laminated ply by providing compression loading to compress the third laminated ply and the fourth laminated ply together.

13. An apparatus, comprising:
   a turbomachine blade coupled to a rotor of a turbomachine and within a fluid path of the turbomachine, wherein the turbomachine blade comprises an exposed portion extending outward from the rotor in a radial direction; and
   a resistive band coupled to the turbomachine blade and configured to resist separation of the turbomachine blade by providing compression loading to the turbomachine blade, wherein the resistive band is disposed on the turbomachine blade at the exposed portion, and the resistive band is spaced apart from the rotor in the radial direction.

14. The apparatus of claim 13, wherein a material composition of the turbomachine blade and the resistive band comprises at least one of a ceramic, a metal, a polymer, a fiberglass, an epoxy, or any combination thereof.

15. The apparatus of claim 13, wherein a first coefficient of thermal expansion of the resistive band is less than or approximately equal to a second coefficient of thermal expansion of the turbomachine blade.

16. The apparatus of claim 13, wherein the resistive band and the turbomachine blade are integrally formed as a one-piece structure.

17. The apparatus of claim 13, wherein the resistive band is adhesively coupled, mechanically coupled, or a combination thereof, to the turbomachine blade.

18. A gas turbine engine, comprising:
   a compressor having a plurality of compressor blades coupled to a compressor rotor and configured to compress air;
   a combustor configured to receive the compressed air from the compressor and to combust a mixture of compressed air and fuel into combustion products;
   a turbine having a plurality of turbine blades coupled to a turbine rotor and configured to receive the combustion products from the combustor; and
   a resistive band coupled to a first blade of the plurality of compressor blades or the plurality of turbine blades, wherein the first blade comprises a first laminated ply, a second laminated ply, and an exposed portion extending outward from the compressor rotor or the turbine rotor in a radial direction, the resistive band is configured to resist separation of the first laminated ply and the second laminated ply by providing compression loading to compress the first laminated ply and the second laminated ply together, the resistive band is disposed on the first blade at the exposed portion, and the resistive band is spaced apart from the compressor rotor or the turbine rotor in the radial direction.

* * * * *